M. D. BYRNE, Jr.
TRACTION SHOE.
APPLICATION FILED APR. 18, 1917.

1,252,997.

Patented Jan. 8, 1918.

WITNESSES
Geo V Naylor
C. F. Murdoch

INVENTOR
Matthew D. Byrne Jr.
BY
ATTORNEYS

UNITED STATES PATENT OFFICE.

MATTHEW D. BYRNE, JR., OF WATERBURY, CONNECTICUT.

TRACTION-SHOE.

1,252,997.　　　　Specification of Letters Patent.　　　Patented Jan. 8, 1918.

Application filed April 18, 1917.　Serial No. 162,856.

*To all whom it may concern:*

Be it known that I, MATTHEW D. BYRNE, Jr., a citizen of the United States, and a resident of Waterbury, in the county of New Haven and State of Connecticut, have invented a new and Improved Traction-Shoe, of which the following is a full, clear, and exact description.

Among the principal objects which the present invention has in view are: to avoid wear upon and cutting of automobile tires; to provide renewable wearing sections; to provide friction traction surfaces; and to reduce the cost of traction shoes such as herein disclosed.

Drawings.

Figure 1:
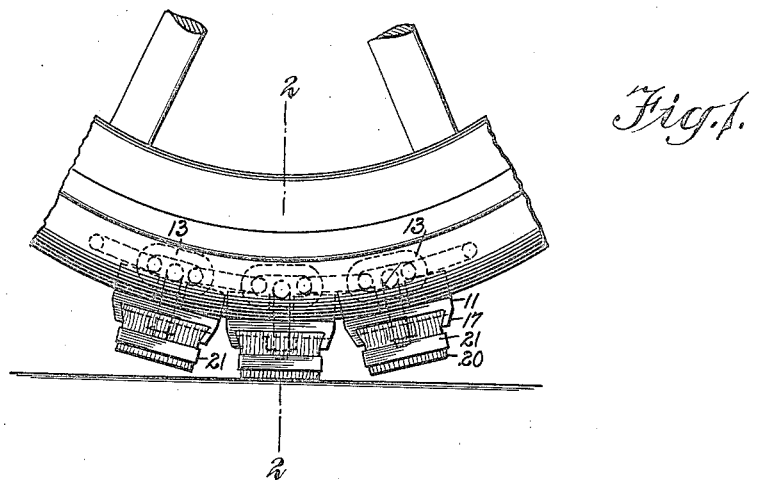
Figure 1 is a side view of a fragment of a vehicle wheel having applied thereto traction shoes constructed and arranged in accordance with the present invention.
Figure 2:
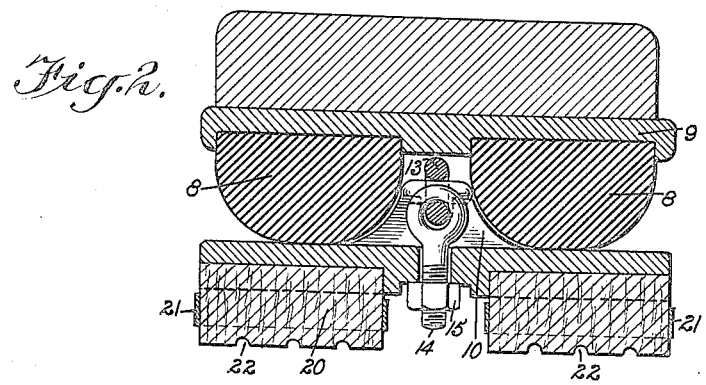
Fig. 2 is a cross section on an enlarged scale of a felly, tire, and shoe constructed and arranged in accordance with the present invention.
Figure 3:
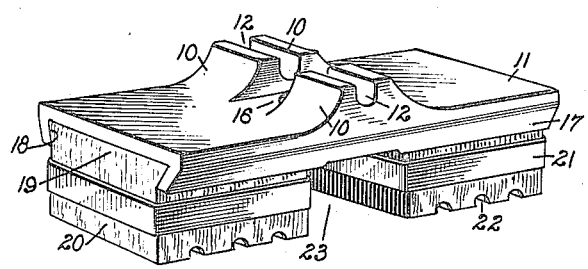
Fig. 3 is a perspective view of a shoe constructed and arranged in accordance with the present invention.

Description.

As seen in the drawings, shoes of the character to which the invention relates, are preferably mounted on wheels having dual resilient tires 8. The tires 8 are usually constructed of solid rubber and are held in grooves provided therefor in a metal rim 9. The tires are separated on the median plane of the wheel, leaving therebetween an annular groove, which in the present invention is taken advantage of as a housing for bosses 10 extended from the inner surface of a shoe plate 11. The lateral surfaces of the bosses 10 are curved to conform with the adjacent surface of the tires 8. The bosses 10 are provided lengthwise with grooves 12 in which links 13 of an attaching chain rest in service.

Each of the links 13 is permanently attached to an eye-bolt 14. The eye-bolt 14 has a threaded end which in service is engaged by a screw nut 15. To receive the eye-bolt 14, the plate 11 has a transverse groove 16. This arrangement of the links and the eye-bolts 14 provides for maintaining said eye-bolts in predetermined spaced relation on the links.

Each of the plates 11 has lateral flanges 17. The flanges 17 are shaped to provide undercut surfaces 18 to form holding grooves for dovetailed sections 19 of blocks 20. The blocks 20 are constructed preferably of wood, the grain of the wood being disposed perpendicular to the plate 11. To prevent the blocks from checking or shattering in service, they are each bound around with a metal band 21. Blocks so constructed may be driven between the flanges 17 to be firmly held in the groove formed thereby while in service. The blocks 20 may be constructed of any suitable material, the invention not being limited to the employ of wood. Also said blocks may have a series of grooves 22 which in service become filled with grit or road metal and add to the traction grip of the shoes on the roadbed. The grooves 22 are valuable adjuncts in service to prevent the tire from skidding.

Usually the chain having the links 13 is fully equipped with the number of shoes required to completely encircle the wheel. Each shoe is held firmly in its service position by the nut 15. The nuts 15 and the exposed ends of the bolts 14 rest in the space or channel between the blocks 20. Any suitable means is employed for holding the chain on the wheel. Various devices have been constructed, which provide means for drawing the ends of the chain together and to lock the same in this position.

It is obvious that as the blocks 20 become worn or damaged, they may be removed from the plates 11 and new blocks may be installed in their stead. It is also obvious that in a vehicle a number of blocks, such as 20, could be carried for such repair, without inconvenience or appreciable loss of space in the vehicle.

When wheels such as herein shown and described are equipped with shoes constructed according to the present invention, the excessive wear incident to the service of heavy trucking on frozen country roads is lessened or relieved. Where the rubber is exposed, it is sometimes lacerated and large bits of it are totally severed by the sharp edges of frozen ground encountered by the tires of a loaded truck when in service under the conditions above named. When furnished with shoes such as described, this excessive wear is totally avoided.

*Claim.*

In combination with a wheel having a plurality of resilient tires, said tires being disposed in spaced relation for forming an annular outwardly-opening groove; a chain surrounding said wheel and mounted in said groove; a plurality of wearing members, each embodying a plate having a transverse projection provided with centrally-disposed perpendicularly-arranged grooves for holding perpendicularly-related links of a chain; a plurality of wearing blocks removably attached to said plates at opposite sides of the median center thereof; and eye-bolts extending through said plates for engaging the links of said chain for binding said shoe plates in service relation to the wheel.

MATTHEW D. BYRNE, Jr.